United States Patent Office 3,418,885
Patented Dec. 31, 1968

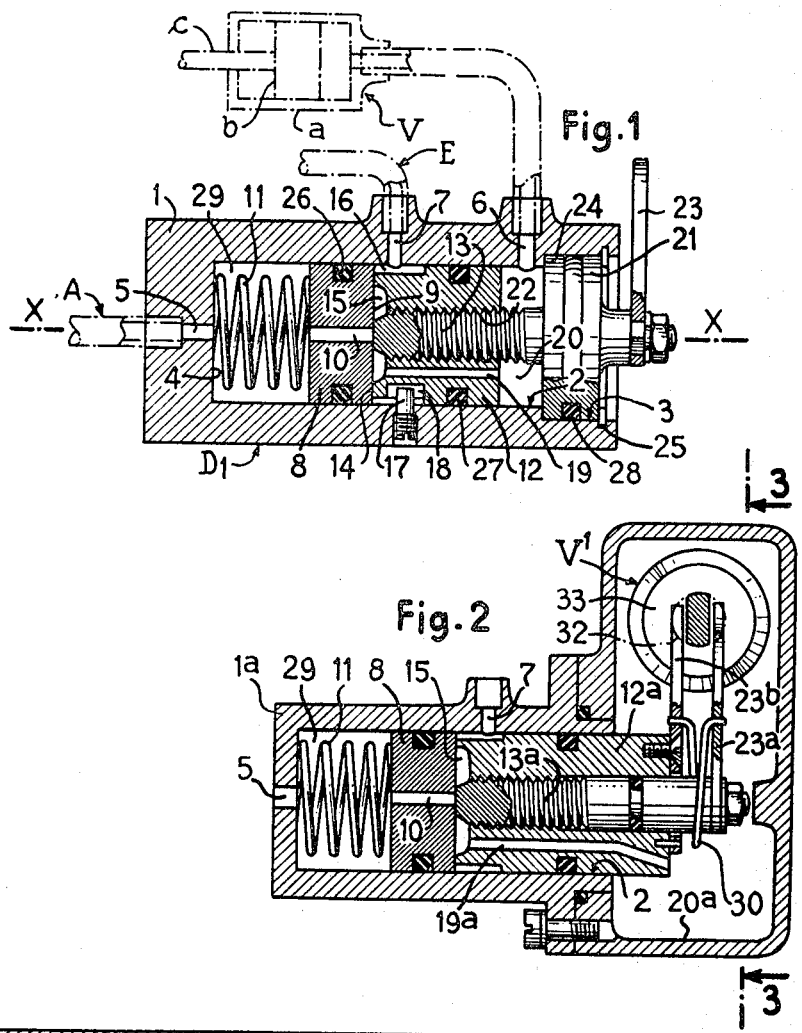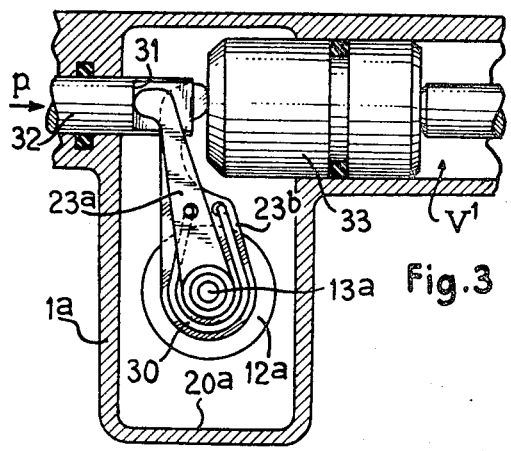

3,418,885
FLUID DISTRIBUTOR
Marcel Dangauthier, Paris, France, assignor to Societe Industrielle et Commerciale des Automobiles Peugeot, Paris, France, a French body corporate
Filed July 12, 1967, Ser. No. 652,845
Claims priority, application France, Aug. 3, 1966, 71,898
6 Claims. (Cl. 91—380)

ABSTRACT OF THE DISCLOSURE

Distributor which comprises, in combination with a single seat, two coaxial closing elements which are longitudinally movable with respect to each other and so arranged that, by their contact with the seat, one of them closes an inlet circuit and the other an outlet circuit.

---

The present invention relates to fluid distributors. The object of the invention is to provide an improved distributor having a rotary drive which controls selectively an inlet circuit and an outlet circuit connected to a jack or other device actuated by said fluid, said distributor being of very simple construction, which is practical and easy, since it has no bores requiring excessively high precision and the danger of an imperfect seal is minimized.

The distributor according to the invention comprises in combination with a single seat, two concentric closing elements which are longitudinally movable with respect to each other and so arranged that, by their contact with said single seat, one of them closes the inlet circuit and the other the outlet circuit.

According to the axial position of the two closing elements relative to the single seat, either of these elements can be in contact with this seat so that the inlet or the outlet is open, the inlet or the outlet being closed or both of them can be in contact with the seat so that the inlet and the outlet are closed.

According to a preferred embodiment, one of the closing elements is a nut forming a piston in a cylindrical cavity in the body of the distributor, whereas the other closing element is a screw screw-threadedly engaged in the nut, the single seat having in the centre thereof an inlet port with which the screw co-operates and the nut having a lip portion in contact with a peripheral portion of the seat.

Further features and advantages of the invention will be apparent from the ensuing description with reference to the accompanying drawing.

In the drawing:

FIG. 1 is a longitudinal sectional view of a distributor according to the invention;

FIG. 2 is a view similar to FIG. 1 of a modification of the invention, and

FIG. 3 is a cross-sectional view taken along the line 3—3 of FIG. 2.

In the embodiment shown in FIG. 1, the distributor $D_1$ according to the invention is adapted either to put the cylindar $a$ of a jack V having a piston $b$ and a piston rod $c$, in communication with an inlet conduit A or with an outlet conduit E or to cut off this cylinder $a$ from the inlet and outlet.

This distributor $D_1$ comprises a body 1 in which is formed a cylindrical bore 2 having a counterbore 3. The end wall 4 of this bore 2 communicates by way of an aperture 5 with the inlet conduit A, and, communicating with the cylindrical wall of the cavity 4, are two radial ports 6 and 7 which are respectively connected to the end of a jack V and to the outlet conduit E.

In the bore 2 is a freely movable piston 8 with has a face 9 forming a seat. The face 9 faces the opposite end of the bore to the end wall 4. An axial aperture 10 is formed in this piston and the latter is biased towards the right by a spring 11 disposed between the rear face of the piston and the end wall 4 of the bore.

The face 9 of the seat 8 co-operates with two coaxial closing elements along the axis X—X of the bore and aperture 10. The elements consist of a nut 12 and a screw 13.

The nut 12 constitutes a closing element by means of an annular lip portion 14 which is coaxial with the axis X—X and capable of bearing in a fluidtight manner against the face 9 of the seat, any separation between the lip portion and said face putting a cavity 15, formed on the rear face of the nut by the lip portion 14, in communication with a peripheral recess 16 with which the outlet port 7 communicates.

It will be observed that the nut 12 is slidably keyed in the bore 2 by any means, such as a stud 17 fixed in the body 1 and engaged in a longitudinally extending recess 18 in the nut.

The cavity 15 communicates, by way of a longitudinally extending aperture 19 extending through the nut 12, with another chamber 20 formed on the forward face of the nut between this face and a flange 21 integral with the screw 13. The inlet port 6 leading to the jack V communicates with this chamber 20.

The screw 13 integral with the flange is consequently screw-threadedly engaged in the tapped aperture 22 of the nut and its rear end constitutes a needle valve relative to the aperture 10 of the seat 8 in bearing against the face 9 around the aperture 10. This screw is rotatable along the axis X—X and can be rotated for example by means of a lever 23 but cannot move in the longitudinal direction since the flange 21 is maintained between the shoulder 24 formed between the parts 2 and 3 of the bore of the body 1 and a split stop ring 25 engaged in the wall of the part 3 of the bore.

The assembly is completed by three elements 26, 27 and 28 which are carried respectively by the piston-seat 8, the nut 12 and the flange 21 of the screw 13.

The distributor operates in the following manner:

When the fluid is supplied by way of the conduit A and the aperture 5 to the chamber 29 formed in the end of the bore 2 behind the piston-seat 8, the following situations could arise:

*1st case.*—The rear end of the valve screw 13 is in the same transverse plane as the bearing face of the lip portion 14 of the nut 12. This is the neutral position, the nut and the screw being in contact with the face 9 of the seat 8. Under these conditions, the fluid under pressure contained in the chamber 29 and the axial aperture 10 is cut off from the jack V.

*2nd case.*—With the nut 12 remaining in the illustrated position in contact with the seat 8, the screw 13 is unscrewed by rotating it by means of the lever 23 in the suitable direction. The rear end thereof forming the needle valve separates from the outlet of the aperture 10 and the fluid under pressure fills the cavity 15 defined by the lip portion 14 on the rear face of the nut 12. The seat 8 remains in contact with this nut owing to the difference in section between the rear face of the seat 8 and the centre part of the forward face of this seat which is the only one immersed in the fluid under pressure contained in the cavity 15. The fluid under pressure flows from this cavity by way of the aperture 19 into the chamber 20 whence, by way of the port 6, it reaches the jack V so as to perform its driving function in shifting the piston $b$ and the rod $c$.

*3rd case.*—In order to put the jack V in communication with the outlet, the screw 13 is screwed in such manner as to move it through the position shown in FIG. 1 and bring the rear end thereof in projecting relation relative to the lip portion 14 of the nut. As this screw 13 bears against the face 9 of the seat 8 and is held axially stationary between the shoulder 24 and the split ring 25, it is the nut 12 which moves towards the right so that the lip portion 14 moves away from the face 9 of the seat 8. The inlet is closed by the bearing of the needle valve 13 against the seat around the aperture 10. On the other hand, the jack V is put in communication with the outlet by way of the port 6, the chamber 20, the aperture 19, the cavity 15, the recess 16, the aperture 7 and the conduit E.

As can be seen, the apparatus is very simple in construction, practical and easy to make since the bore (2–3) does not require a very high precision, the sealing elements 26, 27 and 28 affording the seal without difficulty.

Risk of an imperfect seal is moreover very small since the distributor applies the principle of the tap in which the bearing force is solely a function of the pressure of the fluid.

In cases of utilization in which the extent of the rotational movement of the screw must be small, a screw having a plurality of threads and a rapid pitch could be provided. Such an arrangement is necessary for example when the device is employed for feeding a mechanism having a "follow-up" control in which the effect of the distributor is only a function of the relative movement of two parts, forming a closing element and being in movement, and not of their movement in an absolute sense.

Such a utilization is shown in FIGS. 2 and 3, the device enabling the differential movement between two moving elements to be as it were sensed.

In this arrangement, which is applied to the feeding of a jack known as a "follow-up" jack, the body 1ᵃ has bore 2, but the latter communicates with a chamber 28 which takes the place of the bore 3 and chamber 20 of the embodiment described herein before.

Movable in the bore is the nut 12ᵃ whose longitudinal aperture 19ᵃ puts the rear chamber 15 in communication with a chamber 20ᵃ. This embodiment also comprises the movable seat 8, spring 11 therefor, the inlet aperture 5 and the outlet aperture 7. The nut 12ᵃ is rotatable in the same way as the screw 13ᵃ is rotatable and these two elements are respectively integral with a lever 23ᵃ and a lever 23ᵇ.

These two levers are biased apart under the action of a spring 30 which maintains the end of the lever 23ᵃ against a shoulder 31 of an actuating piston 32 on which a thrust can be exerted in the direction of arrow $p$ (FIG. 3), whereas the lever 23ᵇ bears by the end thereof against the piston 33 of the jack V', this piston having a diameter greater than that of the piston 32. The levers 33ᵃ and 33ᵇ sense the differential movement of the control piston 32 and the actuating piston 33.

When the piston 32 is moved, the lever 23ᵃ and the screw 13ᵃ are rotated and this opens the fluid inlet through the circuit 5–29–10–15–19ᵃ–20ᵃ. The fluid supplied to the chamber 20ᵃ urges the piston 32 towards the right (FIG. 3) and this cuts off the supply by means of the lever 23ᵇ which, in following the piston 33, rotates the nut 12ᵃ in the direction in which the screw 13ᵃ had previously turned this nut and this re-establishes the initial relative position of the screw 13ᵃ and the nut 12ᵃ while resulting in a reaction on the piston 32.

In practice, the movement is completely assisted with a multiplication of the force between that supplied to the piston 32 and that restored by the piston 33 in a ratio corresponding to the ratio between the section of the piston 33 and that of the piston 32.

Inversely, releasing the force on the piston 32 results in the opening of the outlet aperture and the return of the piston 33 of the jack V' to its initial position.

It will be observed that, whether it concerns a single distributor or a distributor having a following-up effect, this device results in a very small time loss between the inlet and outlet since it is only related to the relative elasticity of the closing elements on their seat and, in the case of FIG. 1 to the tangential play of the stud 17 in in the recess 18 in the nut.

Although specific embodiments of the invention have been described, many modifications and changes may be made therein without departing from the scope of the invention as defined in the appended claims.

Having now described my invention, what I claim as new and desire to secure by Letters Patent is:

1. A fluid distributor having a rotary drive and comprising a body defining a cylindrical cavity, an inlet passageway, an outlet passageway, a single seat in said cavity and two concentric closing elements in combination with the seat, one of the closing elements being a nut constituting a piston in said cylindrical cavity, whereas the other closing element constitutes a screw screw-threadedly engaged in said nut, said seat comprising at the centre thereof an inlet aperture with which the screw co-operates whereas the nut comprises a lip portion for contacting a peripheral portion of the single seat, said closing elements being so arranged that, by their contact with said single seat, one of the closing elements closes the inlet passageway and the other element closes the outlet passageway.

2. A fluid distributor as claimed in claim 1, wherein the nut comprises on the face thereof facing the seat a cavity defined by the sealing lip portion and said cavity communicates by way of a longitudinal aperture in said nut with a chamber to be put selectively in communication with the inlet passageway and the outlet passageway, said chamber communicating for example directly with the chamber of a jack.

3. A fluid distributor as claimed in claim 1, comprising a spring, the single seat being movable and biased by the spring which tends to apply it selectively against the lip portion, against the screw and against the lip portion and the screw, depending on the relative positions of the nut and screw.

4. A fluid distributor as claimed in claim 1, wherein the screw is fixed in the longitudinal direction whereas the nut is longitudinally movable, means being combined with the nut for preventing the rotation thereof.

5. A fluid distributor as claimed in claim 1, wherein the screw and the nut are movable both as concerns rotation and in the longitudinal direction and control the distribution to a follow-up jack.

6. A fluid distributor as claimed in claim 5, comprising two levers to which the screw and the nut are respectively connected, a common spring associated with said levers to cause one of the levers to bear against a control piston and the other lever against the piston of the jack, the last-mentioned piston extending directly into the chamber.

References Cited

UNITED STATES PATENTS

| | | | |
|---|---|---|---|
| 801,812 | 10/1905 | Reniff | 137—596 |
| 909,989 | 1/1909 | Charmois | 137—596 |
| 2,985,490 | 5/1961 | Gates | 137—596 |
| 3,310,284 | 3/1967 | Inaba et al. | 91—380 |
| 3,306,170 | 2/1967 | Kreuter | 91—380 |

FOREIGN PATENTS 473,164  10/1937  Great Britain.

PAUL E. MASLOUSKY, *Primary Examiner.*

U.S. Cl. X.R.

137—596